April 5, 1960
K. J. KNUDSEN
2,931,955
INSTRUMENT RELAY
Filed Aug. 24, 1955
2 Sheets-Sheet 2
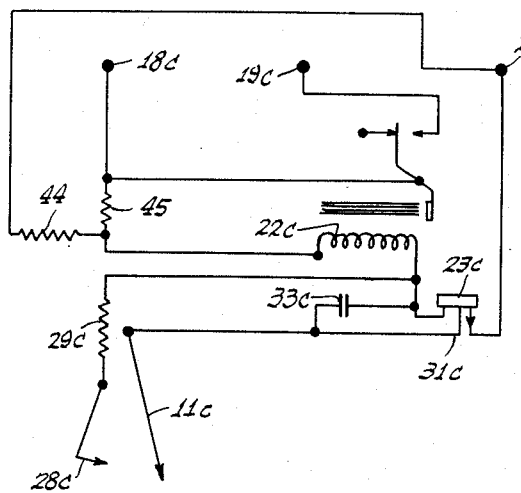
Fig. 3
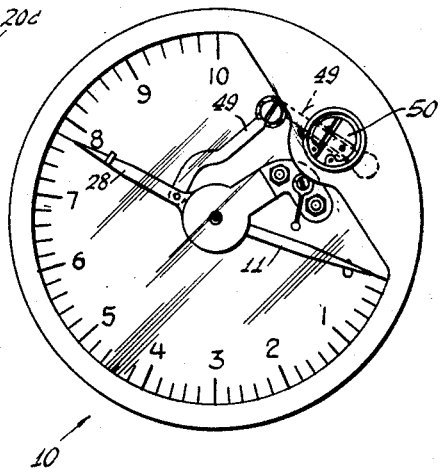
Fig. 4
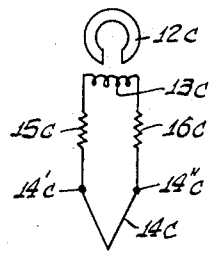
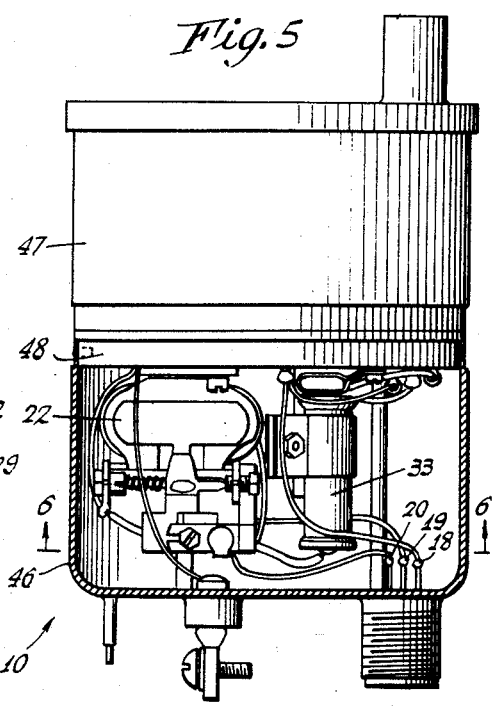
Fig. 5
Fig. 6
INVENTOR.
Knud J. Knudsen
BY
Johnson and Kline
ATTORNEYS

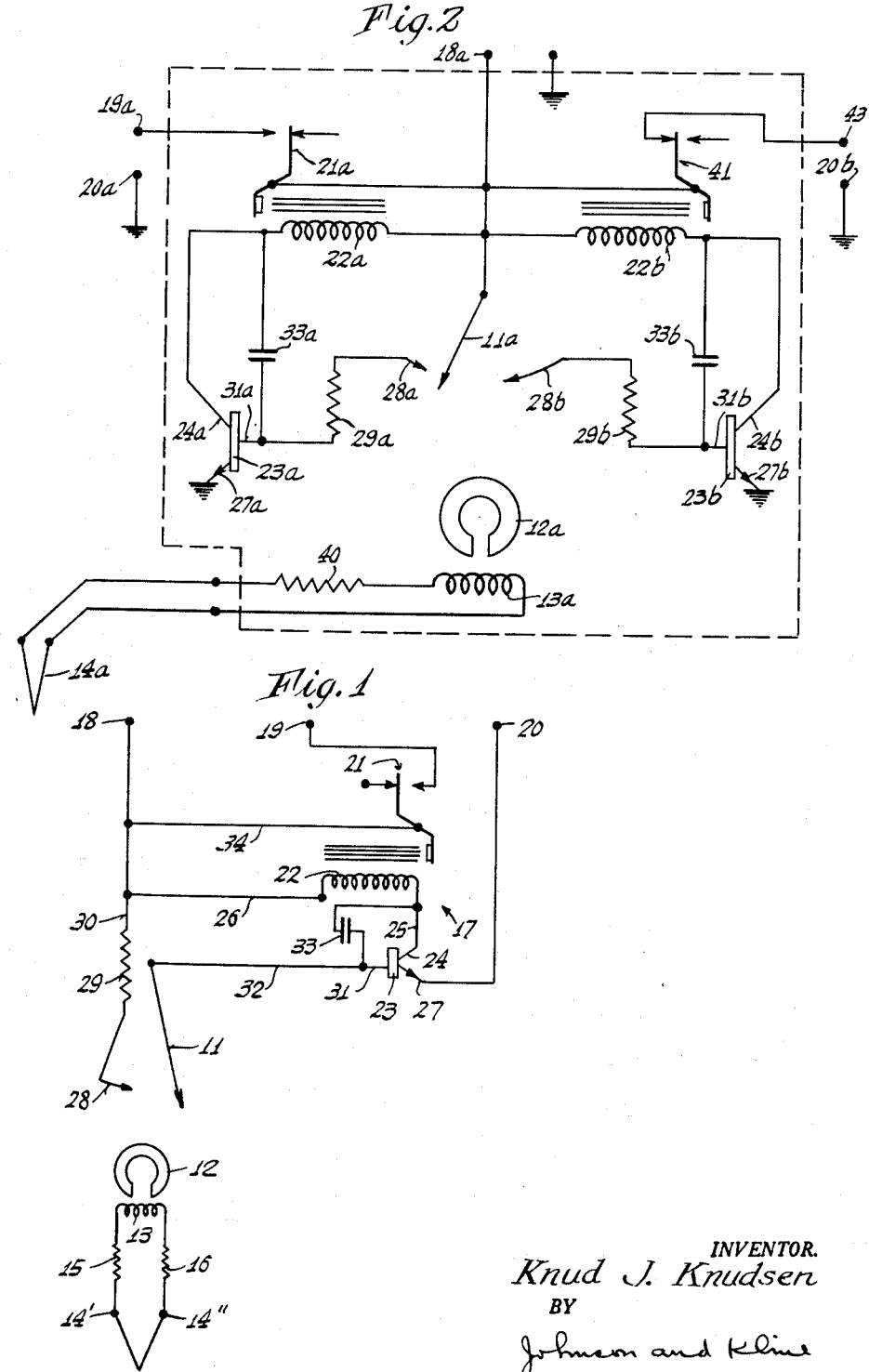

United States Patent Office 2,931,955
Patented Apr. 5, 1960

2,931,955
INSTRUMENT RELAY

Knud J. Knudsen, Woodbury, Conn., assignor to The Lewis Engineering Company, Naugatuck, Conn., a corporation of Connecticut Application August 24, 1955, Serial No. 530,228

2 Claims. (Cl. 317—148.5)

This invention relates to electrical relays and more particularly to sensitive relays which respond to extremely small amounts of electrical energy such as can be conducted by the movable element of a sensitive instrument.

The relay device of the present invention may be advantageously used in connection with signaling and/or controlling means, both audible and visible, which are intended to function in response to predetermined levels of temperature of mechanisms, for example engines, whose operating temperature level is critical.

An object of this invention is to provide a relay device which is sensitive, instantly responsive, reliable and simple, and which may be operated by small amounts of current, such as can be conducted through a sensitive instrument part, and which may be connected to external electrically operated mechanisms for operating same at predetermined positions of the instrument parts.

Another object of the invention is to provide a relay device with the above characteristics which is small and compact, light in weight, and which may be located remote from the mechanisms in which heat is to be controlled or indicated and near the external electrically operated mechanisms.

Still another object of this invention is to provide an instrument relay of the above type which can be contained with the instrument movement, such as a pyrometer, in a unitary sealed instrument case and which consumes such a minute amount of power that the heat dissipated therefrom is insufficient to affect the sensitiveness of the pyrometer even at a high ambient temperature.

Yet a further object of this invention is to provide a relay which consumes very little wattage, is substantially unaffected by vibration such as may be encountered in an aircraft, and yet is of such simple construction that it is reliable in operation.

Heretofore, in connection with sensitive instrument type relays, it has been proposed to provide a circuit containing a vacuum tube maintained with a heated cathode at all times which required a comparatively large amount of power even when the tube was not actuating the relay. When this type of vacuum tube circuit was used to actuate a relay having heavy current-carrying contacts in a sensitive instrument such as a pyrometer, the effect of the power employed to maintain the cathode heated was to cause the temperature within the instrument case to be raised to a level which would increase the possibility of malfunctioning of the instrument. This is especially true where the relay was hermetically sealed in the same instrument container with the instrument movement. Moreover, the complex circuit required by the vacuum tube increases the possibility of breakdown of the relay device when subjected to violent vibratory conditions such as may be encountered in a sensitive pyrometer mounted in an aircraft.

The use of a vacuum tube as the actuator for the relay not only had a comparatively large power requirement and a heavy complex circuit as set forth above, but also had the further disadvantage that the operating time of the instrument relay was dependent upon the life of the tube, which in general is short, especially when the tube is mounted on an aircraft and subjected to the vibrations normally occurring therein.

The disadvantages of the prior instrument type vacuum tube relays are overcome, according to my present invention, by the provision of a novel relay circuit which is actuated by only a small current flow through the pointer of the instrument.

A feature of this invention is the provision of a sensitive valve circuit which upon actuation closes the heavy current-carrying contacts of the relay. The sensitive valve circuit includes a settable contact adjustable within the path of the movable contact (the pointer in the form shown) of the instrument for electrical engagement therewith at a predetermined position. There is also provided in the circuit an electrically-operated relay having heavy duty contacts which are connectible to an electrically operated mechanism for operating same when the settable and movable contacts are in engagement.

By the provision of a novel circuit including a transistor, the instrument relay illustrated in my several embodiments shown herein is capable of actuating the energizing coil of the relay by only a minute current passing through the movable contact of the instrument and also substantially eliminates the rise of temperature within the instrument container. By the use of the novel instrument type relay herein disclosed, I have been able to decrease the power required when the relay is not energized to about $\frac{1}{35}$ of that needed in prior relays of the vacuum tube tybe, with a corresponding decrease of the ambient temperature within the instrument case.

Another feature of this invention is the provision in my relay circuit of means for preventing the relay contacts from chattering whenever the meter contacts, namely the settable contact and the pointer, flicker or rapidly make-and-break due to violent vibrations. This is accomplished by the use of a condenser interposed between the transistor and the energizing coil so that current in the coil is permitted to be discharged at a predetermined rate through the base of the transistor as the coil field collapses.

Another feature of my invention is the provision of a plurality of settable contacts, each of which controls a relay through a transistor positioned above the path of the instrument pointer. Accordingly, the pointer or other movable element of a single instrument can operate a relay at a determined maximum point of travel and also at a determined minimum point of travel without the necessity of providing more than one pointer.

And yet a still further feature of my invention is the provision in an instrument relay of the above type having a transistor, of a compensating resistance which prevents malfunctioning of the transistor at extreme ambient temperatures. A potential divider containing a resistor having a negative temperature coefficient placed in parallel with the collector of the transistor is provided so that at a low ambient temperature the voltage across the transistor will be greater than the voltage across the transistor at an extremely high temperature. By reason of this construction I provide for stable operation of the transistor circuit at extreme degrees of temperature.

Other features and advantages will hereinafter appear.

In the accompanying drawing:

Figure 1 is a schematic diagram of one embodiment of the relay device.

Fig. 2 is a schematic diagram of another embodiment of my invention.

Fig. 3 is a still further embodiment of my invention.

Fig. 4 is an elevation of the front of the instrument.

Fig. 5 is a side view of the instrument with a portion of the container broken away.

Fig. 6 is a view taken on the line 6—6 of Fig. 5.

Referring to Fig. 1, the relay device of the present invention comprises an instrument 10 which is connectible to a thermocouple 14. The thermocouple is mounted adjacent the mechanism, such as an aircraft engine, whose temperature is to be the controlling element in the operation of the instrument and consequently the relay. The instrument 10 has a pivotally mounted pointer 11 and a permanent restoring magnet 12. For moving the pointer in response to the thermocouple current, there is provided an actuating coil 13 which is placed in series with a calibrating resistor 15 and a compensating resistor 16. The thermocouple terminals 14' and 14" complete the circuit of the thermocouple 14 to the instrument.

The relay, generally indicated by the reference numeral 17, is controlled by the thermocouple temperature via the position of the pointer of the instrument, the pointer forming one portion of an electrical switch in the form of the invention illustrated. Three pins or terminals 18, 19 and 20 are provided leading into the instrument case. The pin 18 is connected to the positive side of a D.C. power supply, for example, in the case of an aircraft, to a plus 28 volt D.C. terminal. The pin 20 is connected to the negative side of the D.C. power supply. The pin 19 is connected to the external electrical power device (not shown) operated by the relay as is pin 20, forming a ground therefor. The external device may advantageously be a controlling device, or a signaling device, such as a light bulb or a bell.

The assemblage of the relay comprises a relay operated switch 21 and an operating coil 22 (having a resistance in the neighborhood of 16,000 ohms). While a normally open type relay is shown, it is obvious that a normally closed type could be employed depending merely on how the external device is to be operated.

According to the present invention, the current operating the relay coil 22 is not supplied through a vacuum tube circuit as heretofore was the practice. Instead the relay coil 22 is energized under the control of a transistor. The transistor 23, in the specific embodiment of the invention shown and which I prefer to employ, is a silicon, NPN type. In order to increase the gain between the signal current and the current passing through the relay coil, I connect the transistor 23 in the circuit so that it has a grounded emitter 27. Thus, the emitter 27 is connected in the circuit so that it carries both the base and collector currents and being an NPN type, the emitter 27 is connected to the pin 20, i.e. the ground. The collector 24 of the transistor is connected by a wire 25 to the relay coil 22 and a wire 26 connects the other side of the coil 22 to the pin 18, i.e. the positive side of the D.C. supply. To produce a signal current in the base 31 of the transistor 23 in response to a predetermined position of the pointer 11, an adjustable contact 28 is located in the path of the pointer at the predetermined position. The contact 28 is connected through the resistor 29 (which may be of 600,000 ohms) via the wire 30 to the positive D.C. supply pin 18. The base 31 of the transistor is connected by a wire 32 to the pointer 11.

In order to prevent chattering of the contacts in the relay upon the flickering or rapid make-and-break electrical engagement of the pointer 11 and the adjustable contact 28, I provide a condenser 33 positioned between the wire 25 and the base 31 of the transistor. The condenser 33 permits the current in the coil 22 to be discharged through the base as the magnetic field of the coil collapses. This not only slows up the rate of collapsing of the field but also maintains the signal current on the base of the transistor which permits current to flow through the collector. It will thus be appreciated that when the instrument is subjected to vibrations which may cause quick engagement and disengagement of the pointer 11 and settable contact 28 or a flickering thereof, the relay contacts will be maintained in their actuated or closed position. This is essential because of the quick response of the transistor to changes in the signal current, which, without the provision of the above element, would cause a similar flickering or chattering in the relay contacts.

The operation of the device is as follows:

As the temperature of the thermocouple reaches the temperature of the mechanism whose heat is being measured, an E.M.F. of determinate value passes through the instrument coil 13. This in turn causes a determinate movement of the pointer 11 about its pivot. The adjustable contact 28 is set to engage the pointer at a predetermined position on its path of travel. For example, with the adjustable contact located on the meter at the 1000° C. mark, when the temperature of the mechanism, a jet-engine for example, reaches this temperature, the pointer 11 will engage the contact 28 and current will flow from the pin 18 through the resistor 29, the contact 28, the pointer 11 and line 32 to the base of the transistor 23. This will excite the transistor 23, lowering the output resistance thereof to the passage of current between the collector 24 and the emitter 27. Accordingly, a large amount of current will flow from the pin 18 through the line 26, coil 22, collector 24 and emitter 27 to the ground pin 20. Actuation of the energizing coil 22 causes the normally open switch 21 to close permitting current to flow from the pin 18 through the line 34 and switch 21 to the pin 19. The electrically operated device (which may be on the order of 10 watts) to be energized is connected between the pins 19 and 20. In the event of flickering between the contact 28 and the pointer 11 due to vibration, current may pass to the base 31 by way of the condenser 33 to maintain the coil 22 energized. Upon lowering of the temperature, the pointer 11 will disengage the contact 28 and open the circuit to the base 31 of the transistor, which creates the normal output resistance between the collector and the emitter, which places such a high resistance in the coil circuit that insufficient current can flow through the coil 22 to maintain it energized.

In the embodiment disclosed in Fig. 2, there is shown a normally open electromagnetically controlled relay which is actuated by the instrument at an adjustable maximum temperature. Moreover, there is provided a normally closed electromagnetically operated relay which is openable at an adjustable minimum temperature. In this embodiment like numerals are used to indicate the same elements as in the previous embodiment, only for the maximum relay the numerals are followed by the suffix a, while in the minimum, the suffix b is employed.

In this embodiment, the thermocouple 14a is connected to the moving coil 13a of the meter through a resistor 40 which accomplishes both the compensating and calibrating. The instrument is also provided with a permanent horseshoe magnet 12a and a pointer 11a.

As in the previous embodiment, there is provided a switch 21a, an energizing coil 22a and a transistor 23a. The positive side of the D.C. power supply is connected to a pin 18a and with the pointer 11a of the instrument engaging the adjustable contact member 28a, a signal will be given to the transistor base 31a which will decrease the output resistance of the transistor and permit a large current to flow through the coil 22a, the collector 24a and the emitter 27a. This causes the switch 21a to close and the current can then flow from 18a through 21a to pin 19a. Electrical equipment to be operated when the maximum predetermined temperature is reached is connected to pins 19a and 20a. A resistor 29a is provided to limit the current through the pointer and transistor base.

The minimum temperature normally closed relay is provided with a normally closed switch 41, a solenoid 22b and a transistor 23b. The adjustable minimum temperature contact 28b is connected through the resistor 29b to the base 31b of the transistor 23b so that when the pointer 11a is in electrical engagement with the contact 28b a signal is transmitted to the base of the transistor. This reduces the transistor output resistance and permits a large current to flow through the coil 22b, the collector 24b and the emitter 27b. The switch 41 is then opened. The electrically operated power unit to be controlled by the minimum temperature switch and relay is connected to the terminals 43 and 20b.

As in the first embodiment, condensers 33a and 33b are provided in the maximum and minimum temperature relays respectively, to obviate any chattering of a relay upon flickering between the pointer and the settable contact.

Referring to Fig. 3, there is disclosed another embodiment of my invention similar to that shown in Fig. 1, but in which there is provided a means for varying the voltage across the transistor in order to provide for stability of the transistor at extreme temperatures. In this embodiment, like numerals indicate the same elements as in the previous embodiment but with a suffix c employed to differentiate therefrom.

A resistor 44 (which at ambient temperature of 0° C. may have a resistance of 5,000 ohms) and having a negative temperature coefficient is connected between the ground 20c and the coil 22c. The resistor 44 may advantageously be of the "Globar" type which has a very high negative temperature coefficient of resistance. Located between the terminal 18c and the coil 22c is a resistor 45 (which may have a value of about 500 ohms). In series with the pointer and the settable contact is a current-limiting resistor 29c (which may be on the order of 100,000 ohms) for limiting the current flow to the settable contact 28c, the point 11c and the base 31c of the transistor 23c. It will be apparent that the resistors 44 and 45 form a potential divider in which the potential across the resistor 44 is the same as the potential across the coil 22c and transistor 23c and that this potential varies with the ratio of the resistance of the resistor 44 divided by the sum of the resistors 44 and 45. For example, with a 30 volt D.C. bias supply to the terminals and the values recited herein, at an ambient temperature of 0° C., a potential of approximately 26 volts is impressed across the relay 22c and transistor 23c, while at −55° C. about 27.5 volts is impressed, and at +71° C. about 23 volts. The values given herein must of course be considered only exemplary and I do not desire to be limited thereto. I also employ a condenser 33c for the reasons previously given.

In Figs. 4, 5 and 6, the elements of the relay circuit of Fig. 3 are shown as they may be positioned within an instrument casing. The cylindrical casing is formed of two end caps 46 and 47 detachably secured to a circular disk 48. The front end cap protects the instrument movement. In Fig. 4, the settable contact 28 is mounted for concentric movement with the pointer 11 and is set by the linkage 49 through the eccentric 50. It will be apparent from these figures that the components of my instrument relay can readily be positionable within the minute confines of an instrument casing.

Variations and modifications may be made within the scope of the claims and portions of the improvements may be used without others.

I claim:
1. An instrument relay enclosed in a casing comprising an electric instrument movement having a moving element and a pointer attached thereto, a stationary contact set in the path of movement of said pointer for electrical engagement therewith at a predetermined position of said pointer, means connectible to a source of electrical energy, second means connectible to an output, and control means including the pointer and the stationary contact interconnecting said first and second means to enable said first means to be electrically connected to said second means when the pointer and stationary contact are in electrical engagement, said control means including a circuit having an energizing coil operated relay and a transistor, the collector of said transistor being connected in series with the coil and being connected to one side of the source of electrical energy, the base of said transistor being connected to the pointer, the stationary contact being connected to the one side of the source of electrical energy and the emitter being connected to the other side of the source of electrical energy.

2. An instrument relay enclosed in a casing comprising an electric instrument movement having a moving element and a pointer attached thereto, a stationary contact settable in the path of movement of said pointer for electrical engagement therewith at a predetermined position of said pointer, means connectible to a source of electrical energy, second means connectible to an output, and control means including the pointer and the stationary contact interconnecting said first and second means to enable said first means to be electrically connected to said second means when the pointer and stationary contact are in electrical engagement, said control means including a circuit having an energizing coil operated relay and a transistor, the collector of said transistor being connected in series with the coil and being connected to one side of the source of electrical energy, the base of said transistor being in series with the pointer and stationary contact and through a current limiting resistance to the one side of the source of electrical energy, the emitter being connected to the other side of the source of electrical energy and in which there is a negative temperature coefficient resistor connected in parallel to the coil and collector and emitter of the transistor to vary the potential thereacross with changes in temperature.

References Cited in the file of this patent
UNITED STATES PATENTS

| | | |
|---|---|---|
| 2,528,336 | Bristol | Oct. 31, 1950 |
| 2,575,951 | Gilbert | Nov. 20, 1951 |
| 2,579,336 | Rack | Dec. 18, 1951 |
| 2,584,990 | Dimond | Feb. 12, 1952 |
| 2,652,460 | Wallace | Sept. 15, 1953 |
| 2,693,572 | Chase | Nov. 2, 1954 |
| 2,697,803 | Eadie | Dec. 21, 1954 |
| 2,745,021 | Kurshan | May 8, 1956 |
| 2,750,453 | Pritchard | June 12, 1956 |
| 2,778,942 | Ehret | Jan. 22, 1957 |
| 2,786,964 | De Witt | Mar. 26, 1957 |

FOREIGN PATENTS

| | | |
|---|---|---|
| 1,066,656 | France | Jan. 20, 1954 |